US010703331B2

(12) United States Patent
Loew et al.

(10) Patent No.: US 10,703,331 B2
(45) Date of Patent: Jul. 7, 2020

(54) SEAT MOUNTED ADJUSTABLE SEAT BELT WEBBING GUIDE

(71) Applicant: Ford Global Technologies, LLC, Dearborn, MI (US)

(72) Inventors: Pattrick Loew, Dearborn, MI (US); Benjamin Yilma, Canton, MI (US); Travis Justin Raines, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/226,044

(22) Filed: Dec. 19, 2018

(65) Prior Publication Data

US 2019/0118761 A1    Apr. 25, 2019

Related U.S. Application Data

(62) Division of application No. 15/212,607, filed on Jul. 18, 2016, now Pat. No. 10,196,033.

(51) Int. Cl.
*B60R 22/20* (2006.01)
*B60R 22/26* (2006.01)
*B60R 22/18* (2006.01)

(52) U.S. Cl.
CPC .............. *B60R 22/26* (2013.01); *B60R 22/20* (2013.01); *B60R 2022/1818* (2013.01); *B60R 2022/1831* (2013.01); *B60R 2022/207* (2013.01)

(58) Field of Classification Search
CPC . B60R 22/20; B60R 22/26; B60R 2022/1831; B60R 2022/1843; B60R 2022/207; B60R 2022/1818; B60N 2/688

USPC .................. 297/483, 468, 473, 485; 280/808
See application file for complete search history.

(56) References Cited

U.S. PATENT DOCUMENTS

| | | | | | |
|---|---|---|---|---|---|
| 1,327,108 | A | * | 1/1920 | McKay | A47C 20/043 5/617 |
| 3,296,667 | A | * | 1/1967 | Streule | A43C 11/14 24/68 SK |
| 4,971,393 | A | * | 11/1990 | Maisenhalder | A47C 7/383 297/397 |

(Continued)

FOREIGN PATENT DOCUMENTS

| | | | | |
|---|---|---|---|---|
| DE | 4340337 A1 | * | 6/1994 | .......... B60R 22/024 |
| EP | 1514748 A1 | | 3/2005 | |

(Continued)

OTHER PUBLICATIONS

Machine translation of foreign reference DE 4340337, obtained from http://translationportal.epo.org/emtp/translate/?ACTION=description-retrieval&COUNTRY=DE&ENGINE=google&FORMAT=docdb&KIND=A1&LOCALE=en_EP&Number=4340337&OPS=ops.epo.org/3.2&SRCLANG=de&TRGLANG=en (last accessed on Jul. 19, 2019) (Year: 2019).*

*Primary Examiner* — Theodore V Adamos
(74) *Attorney, Agent, or Firm* — David Coppiellie; Price Heneveld LLP (57) ABSTRACT

A webbing guide for a vehicle seat includes a base defining a length between a first end and a second end and defining a plurality of pairs of corresponding spaced-apart post holes extending through the base between top and bottom surfaces thereof. The webbing guide further includes a guide body coupled with the base and defining a guide channel extending through the guide body in a direction generally normal to the length of the base and normal to the post holes.

20 Claims, 8 Drawing Sheets

(56) References Cited

U.S. PATENT DOCUMENTS

| | | |
|---|---|---|
| 5,263,741 A | 11/1993 | Seros et al. |
| 5,346,256 A | 9/1994 | Wiesler et al. |
| 5,730,499 A | 3/1998 | Salisbury, Jr. |
| 5,800,085 A * | 9/1998 | Lee ...................... G06F 1/1616 |
| | | 400/489 |
| 5,823,627 A | 10/1998 | Viano et al. |
| 5,897,169 A * | 4/1999 | Larsen .................... B60R 22/26 |
| | | 280/808 |
| 5,979,991 A | 11/1999 | Lewandowski et al. |
| 6,520,588 B1 | 2/2003 | Busch |
| 6,592,149 B2 | 7/2003 | Sessoms |
| 6,669,302 B2 | 12/2003 | Warner, Jr. et al. |
| 6,749,223 B2 | 6/2004 | Kazuo et al. |
| 6,811,186 B1 | 11/2004 | Fraley et al. |
| 6,880,893 B1 | 4/2005 | Scotton |
| 7,111,814 B1 * | 9/2006 | Newman ............. B60R 11/0211 |
| | | 248/274.1 |
| 7,273,232 B2 | 9/2007 | Fontecchio et al. |
| 7,275,273 B2 * | 10/2007 | Lary .................... A47C 20/021 |
| | | 297/377 |
| 7,584,990 B2 | 9/2009 | Suyama et al. |
| 7,618,097 B2 | 11/2009 | Ghatge |
| 8,646,845 B2 | 2/2014 | Varcus |
| D741,396 S * | 10/2015 | Pelini ...................... B60R 11/00 |
| | | D16/242 |
| 9,586,529 B1 * | 3/2017 | Sanchez ................... B60R 7/10 |
| 9,818,095 B2 * | 11/2017 | Altman .................. B60R 11/00 |
| 10,040,399 B1 * | 8/2018 | Manzo ..................... B60R 7/10 |
| 2004/0032541 A1 * | 2/2004 | Rochel ............... B60R 11/0235 |
| | | 348/825 |
| 2005/0248145 A1 * | 11/2005 | Fontecchio ........... B60R 22/022 |
| | | 280/808 |
| 2006/0119092 A1 | 6/2006 | Downey |
| 2007/0170769 A1 | 7/2007 | Beneker et al. |
| 2007/0182136 A1 | 8/2007 | Nezaki et al. |
| 2011/0316321 A1 | 12/2011 | Kujawa et al. |
| 2014/0139005 A1 | 5/2014 | Rouhana |
| 2017/0120860 A1 | 5/2017 | Shenaq et al. |
| 2017/0369029 A1 | 12/2017 | Loew et al. |
| 2019/0001854 A1 * | 1/2019 | Gunn ...................... B60N 2/90 |

FOREIGN PATENT DOCUMENTS

| | | |
|---|---|---|
| EP | 1918164 B1 | 7/2009 |
| EP | 2001714 B1 | 8/2015 |
| EP | 2923897 A1 | 9/2015 |

* cited by examiner

SEAT MOUNTED ADJUSTABLE SEAT BELT WEBBING GUIDE

CROSS-REFERENCE TO RELATED APPLICATIONS

This application is a divisional application of and claims priority to U.S. patent application Ser. No. 15/212,607 entitled SEAT MOUNTED ADJUSTABLE SEAT BELT WEBBING, filed on Jul. 18, 2016, by Pattrick Loew, the entire disclosure of which is incorporated herein by reference.

FIELD OF THE INVENTION

The present invention generally relates to a webbing guide for a seatbelt associated with a vehicle seat. In particular, the webbing guide includes a moveable guide body to adjust a position of the webbing with respect to the seat.

BACKGROUND OF THE INVENTION

The widely varying sizes and body-types of vehicle seat occupants can result in seatbelts associated with such vehicle seats contacting the use at varying points along the user's body. In some instances, particularly with respect to shorter occupants, the webbing positioning can cause uncomfortable contact with the seat occupant's neck. Other undesirable positions are also possible based on particular webbing and set configuration, as well as specific physical aspects of the seat occupant.

Various assemblies for achieving particular positioning of a seatbelt webbing with respect to the associated vehicle seat are available. In particular, some such positioning assemblies include a vertically moveable D-ring or other such assembly for moving an upper anchoring point of the webbing vertically up and down along the B-pillar of the associated vehicle. Other assemblies include various fixed guides or pass-throughs on the vehicle seat itself. Notably, such assemblies either fail to adjust the webbing positioning at all or do not directly address the issue of lateral positioning of the webbing on the user. Accordingly, further improvements are desired.

SUMMARY OF THE INVENTION

According to one aspect of the present disclosure, a webbing guide for a vehicle seat includes a base defining a length between a first end and a second end and defining a plurality of pairs of corresponding spaced-apart post holes extending through the base between top and bottom surfaces thereof. The webbing guide further includes a guide body coupled with the base and defining a guide channel extending through the guide body in a direction generally normal to the length of the base and normal to the post holes.

According to another aspect of the present disclosure, a vehicle seat includes a seatback, a headrest coupled with the seatback by a pair of posts, and webbing guide. The webbing guide includes a base defining a length between a first end and a second end and defining a plurality of pairs of corresponding spaced-apart post holes extending through the base between top and bottom surfaces thereof a guide body coupled with the base and defining a guide channel extending through the guide body and spaced apart from the post holes.

According to another aspect of the present disclosure, a vehicle includes vehicle seat coupled within the vehicle and including a seatback and a headrest coupled with the seatback by a pair of posts, a webbing coupled with the vehicle and associated with the vehicle seat, webbing guide. The webbing guide includes a base defining a length between a first end and a second end and defining a plurality of pairs of corresponding spaced-apart post holes extending through the base between top and bottom surfaces thereof and a guide body coupled with the base and defining a guide channel extending through the guide body, receiving the webbing, and spaced apart from the posts.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
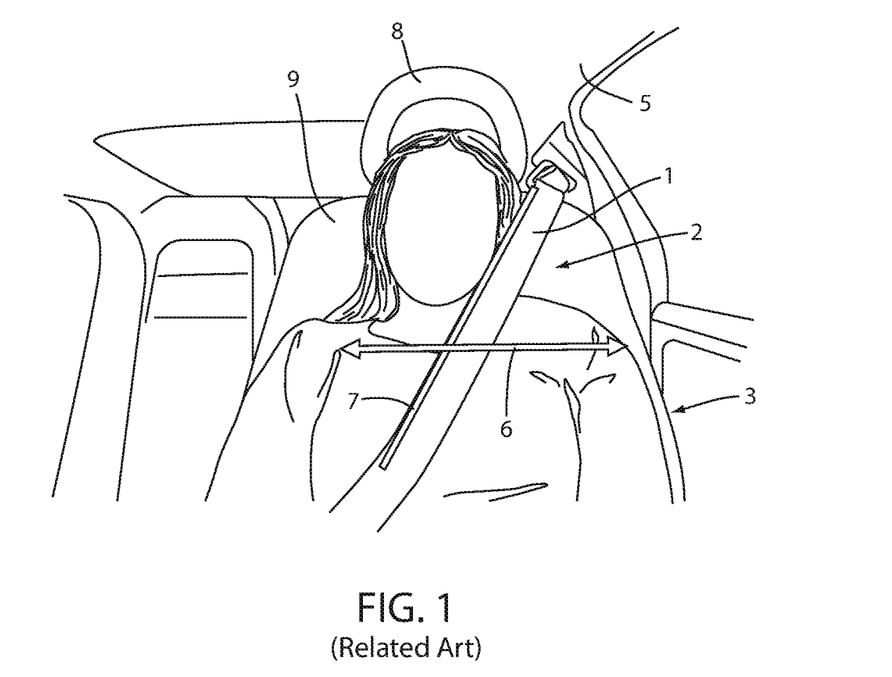
FIG. 1 is a is a front perspective of a related-art vehicle seat having an occupant and showing a possible positioning of an associated seatbelt webbing with respect to the occupant.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a webbing guide for a vehicle seat 12. Webbing guide 10 includes a base 13 defining a length 14 between a first end 16 and a second end 18 of the base 13. Base 13 further defines first and second spaced apart post holes 20a and 20b extending through the base 13 between a top surface 22 and a bottom surface 24. Base 13 further includes a guide body 26 coupled with base 13 and defining a guide channel 28 extending through guide body 26 in a direction 30 generally normal to the length 14 of base 13 and generally normal to post holes 20a and 20b.

Figure 3:
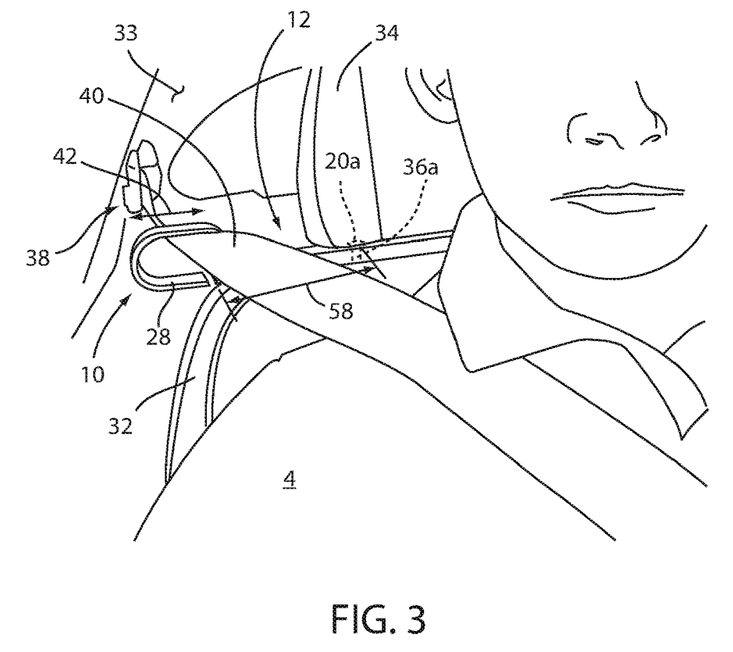
FIG. 3 is a front perspective view of a vehicle seat having an occupant and showing a possible positioning of an associated seatbelt webbing with respect to the occupant, as provided by the webbing guide of FIG. 2.
Figure 4:
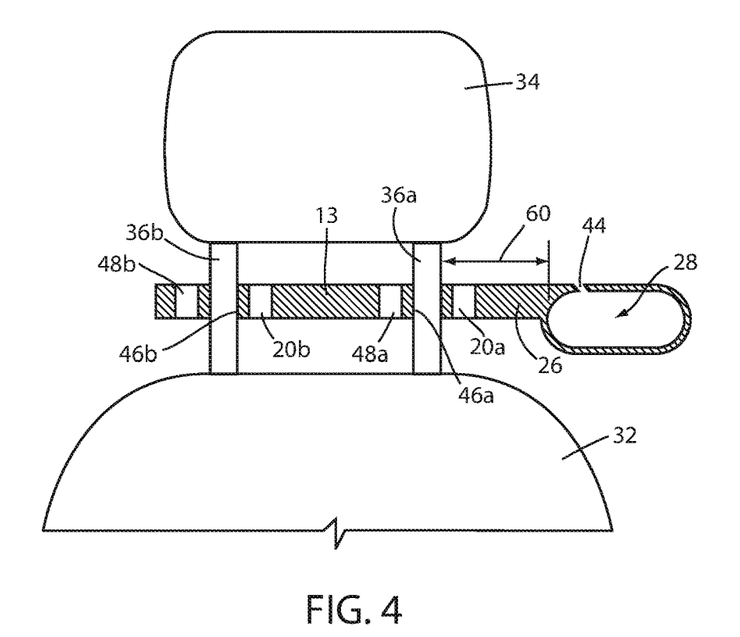
FIG. 4 is a front cross-section view of a variation of the webbing guide of FIG. 2.

As further shown in FIGS. 3 and 4, webbing guide 10 can be included in an assembly with a vehicle seat 12, which further includes a seatback 32 and a headrest 33 coupled with seatback 32 by a pair of posts 36a, 36b. Further, seatback 32 may be adjustably coupled with a seat base that is slidably mounted within vehicle 34. The coupling of headrest 33 with seatback 32 by posts 36a, 36b may be such that posts are slidably received within seatback 32 and, further, fixedly or rotatably assembled with headrest 33, such that headrest 33 may be adjustable with respect to seatback 32 by vertical translation toward and away from seatback 32 as well as fore and aft tilting with respect to seatback 32. Further, this arrangement can allow for disassembly of headrest 33 from seatback 32 by sliding posts 36a, 36b out from engagement with seatback 32. Known mechanisms can be used to achieve temporary fixation of an adjusted height position of headrest 33 relative to seatback 32 as well as to prevent inadvertent removal headrest 33 from seatback 32.

As shown in FIG. 4, webbing guide 10 can be assembled with vehicle seat 12 in a position vertically between seatback 32 and headrest 33 by assembling webbing guide 10 such that posts 36a, 36b are respectively received within ones of the first post holes 20a and 20b. In this manner, guide channel 28 can be positioned laterally outside and away from a location of headrest 33. By spacing apart guide channel 28 away from posts 36a, 36b. As further shown in FIG. 3, webbing 40 of seatbelt 38 can be received within guide channel 28 through guide body 26 such that webbing 40 is maintained at a position away from headrest 33 and/or posts 36a, 36b by the above-mentioned positioning of guide channel 28.

As shown in FIG. 3, the orientation of guide channel 28 in direction 30 and in relationship to the directions of first holes 20a and 20b as well as length 14 of base 13 is such that guide channel 28 is advantageously positioned for receiving webbing 40 therethrough as the seatbelt 38 structured generally associated therewith is configured such that webbing 40 extends in a similar direction over and around a corresponding portion of seatback 32. Further, the location of guide channel 28 at a distance 58 away from a particular one of posts 36a and 36b (36a as depicted in FIG. 3) that is laterally closest to guide channel 28, webbing guide 10 may be able to position a portion of webbing 40 adjacent to seatback 32 and disposed toward a shoulder of an occupant 4 of vehicle seat 12 outwardly, for example, away from the neck of occupant 4 and into a more comfortable position for extension over the occupant's torso.

As discussed herein, the direction 30 of guide channel 28 is described as generally perpendicular to post holes 20a, 20b, as well as the length 14 of base 13. This description is used to define a basic relationship among these components and does not require that such components or features be arranged at orthogonal directions relative to one another, but rather, is used to establish that post holes 20a and 20b in what would be primarily considered a vertical direction that base 13 extends in a generally lateral direction relative to post holes 20a and 20b, and within the vehicle 34 within which webbing guide 10 is used, and that guide channel 28 would be considered as generally extending in a fore-aft direction within vehicle 34 when webbing guide 10 is assembled with vehicle seat 12. In various embodiments, guide channel 28 may be, by way of configuration of guide body 26, including a point of coupling therewith to base 13, may be, for example angled downwardly and inwardly to more closely match the particular direction of travel to webbing 40 over seatback 32. In such a configuration guide channel 28 would still be considered as extending in a direction generally normal to that of post holes 20a, 20b and/or length 14 of base 13.

Figure 2:
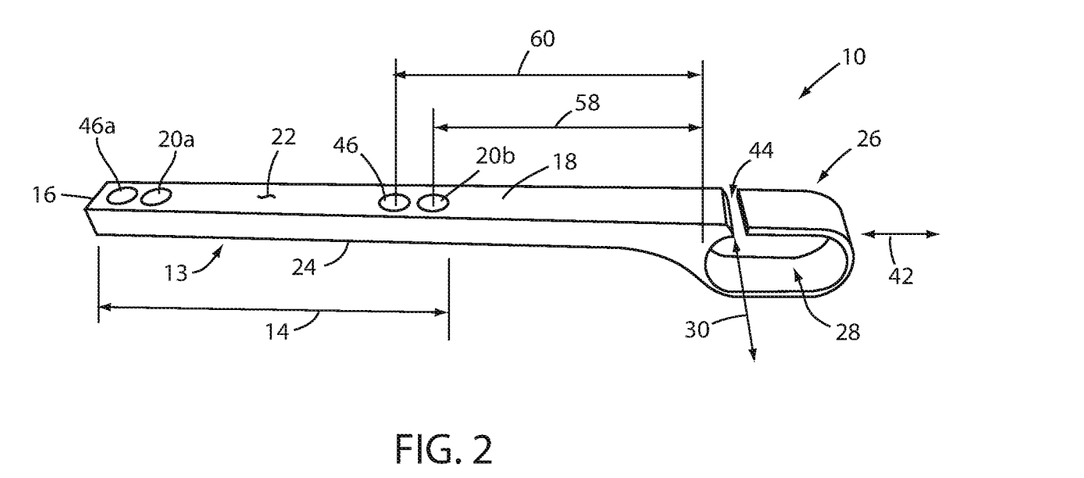
FIG. 2 is a front perspective view of a seatbelt webbing guide according to an aspect of the disclosure.

As further shown in FIG. 2, base 13 may further define a second pair of corresponding post holes 46a, 46b such that webbing guide 10 can be optionally assembled with vehicle seat 12 by way of engaging posts 36a and 36b with either the corresponding ones of first holes 20a, 20b or second holes 46a, 46b. As shown in FIG. 2, by positioning the various sets of post holes 20a, 20b and 46a, 46b at varying distances 58 and 60 with respect to guide channel 28 webbing guide 10 may be adjustable with respect to vehicle seat 12 including with respect to posts 36a, 36b, seatback 32, and headrest 33 such that guide channel 28 is adjustable in a direction 42 toward or away from posts 36a, 36b and/or seatback 32 and headrest 33. In this manner the particular location of webbing 40 with respect to occupant 4 of vehicle seat 12 can be adjusted by selectively assembling webbing 10 in either of the various positions associated with post holes 20a, 20b or 46a, 46b.

In the example described above, wherein headrest 33 is removable from seatback 32 by disengagement of posts 36a, 36b from seatback 32, webbing guide 10 may be repositioned, as discussed above, by removing headrest 33 from seatback 32, thereby exposing free ends of posts 36a, 36b. Subsequently, user can pull webbing guide 10 away from headrest 33 such that posts 36a, 36b become disengaged from the current ones of selected post holes 20a, 20b or 46a, 46b, thereby disassembling webbing guide 10 from headrest 33. The user can then re-assemble webbing guide 10 in another desired position by positioning posts 36a, 36b within the other of the respective post holes 20a, 20b or 46a, 46b. In a similar manner, webbing guide 10 may be completely removed form assembly with vehicle seat 12, if a user so desires. As a further alternative, such an arrangement can allow for selective assembly or re-assembly of webbing guide 10 with vehicle seat 12, such as in an after-market setting wherein webbing guide sold as an accessory and selectively assembled with one or more of vehicle seats 12 in a vehicle 34 by, for example, an owner of vehicle 34. As shown in FIGS. 2-4, guide body 26 can define a slot 44 between guide channel 28 and exterior of guide body 26 such that webbing 40 can be selectively moved into and out of guide channel 28, such as during assembly and/or disassembly of webbing guide 10 with vehicle seat 12. As further shown in FIGS. 3 and 4, webbing guide 10 is configured such that it can be used on for example, either a driver side or passenger side vehicle seat 12, simply by flipping the orientation of webbing guide 10 with guide channel 28 positioned on the appropriate outer most lateral side of the vehicle seat 12.

Figure 5:
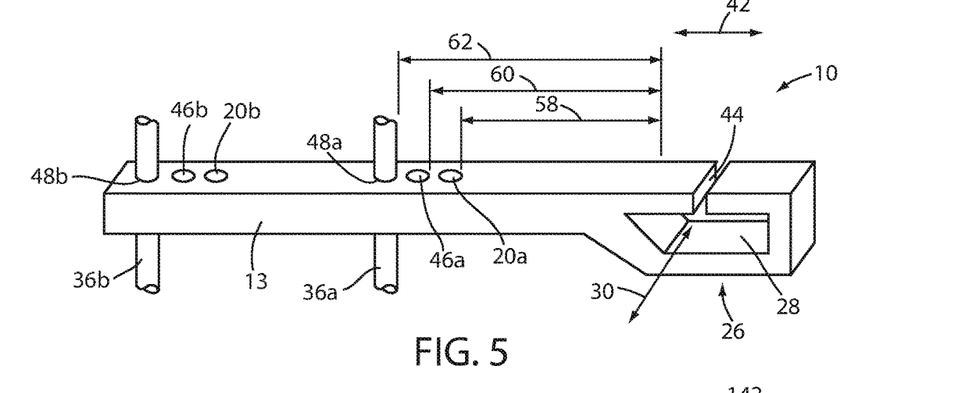
FIG. 5 is a front perspective view of a variation of the webbing guide of FIG. 4.

As further shown in FIGS. 4 and 5, a variation of the current embodiment of webbing guide 10 may further include a third set of post holes 48a, 48b which may, as discussed above selectively receive posts 36a, 36b to provide a third adjustable distance 62 of guide channel 28 from posts 36a. In this manner, a further level of adjustment for guide channel 28 with respect to, for example, headrest 33 may be achieved.

Figure 6:
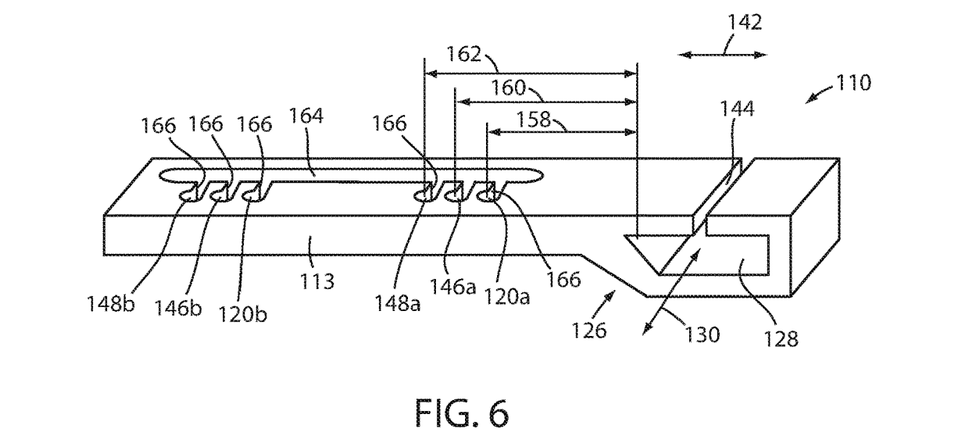
FIG. 6 is a front perspective view of a further variation of a seatbelt webbing guide according to another aspect of the disclosure.

Turning to FIG. 6, a further embedment of webbing 110 is shown with a guide channel 128 that is similarly configured with respect to a corresponding base 113, as described above with respect to FIGS. 1-5. Further, base 113 defines a plurality of respective pairs of post holes including a first pair 120a, 120b, second pair 146a, 146b, and a third pair 148a, 148b. As described above such pairs of post holes define respective distances 158, 160, 162 of guide channel 128 with respect to, for example, corresponding headrest posts received therein.

As illustrated, the various pairs of post holes 120, 146, and 148 can be interconnected by way of a laterally-extended slot 164 extending in the direction of length 14 of base 13 in parallel with a theoretical line through the centers of the post holes 120, 146, and 148. Slot 164 can be joined with the respective post holes 120, 146, and 148 by corresponding key channels 166 that branch off of slot 164 and extend, respectively, to join with the corresponding post holes 120, 146, and 148. As further illustrated, a width of the key channels 166 can be somewhat less than the diameters of the corresponding post holes 120, 146, and 148, which themselves can be sized to closely fit with corresponding posts 136 such that a reliably stable fit is achieved within webbing guide 10 and vehicle seat 12. In this manner, posts 136a, 136b can be respectively snapped into and out of selected ones of the pairs of post holes, including first pair 120a, 120b, second pair 146a, 146b, and third pair 148a, 148b. When disengaged from corresponding pairs of post holes 120, 146, and 148, posts 136 are positioned within slot 164 such that webbing guide 10 is slidably disposed within direction 142 about posts 136. In this manner, a user can selectively adjust the lateral positioning of webbing guide 110, including guide channel 128 by snapping webbing guide 110 out from engagement of a first pair of post holes e.g. 120a, 120b through the corresponding key channels 166 and into a position within slot 164. Webbing guide 10 can then be laterally moved in direction 142 such that posts 136a, 136b align with a different pair of post holes e.g., 146a, 146b, whereby a user can engage 136a, 136b with such post holes 146, 146b by applying an appropriate force onto base 113 of webbing guide 110 to move posts 136a, 136b through key channels 166 and into engagement with desired post holes 146a, 146b. In this manner, the positioning of webbing guide 110 relative to vehicle seat 112 can be adjusted without removal of headrest 133 from seatback 132.

Figure 7:
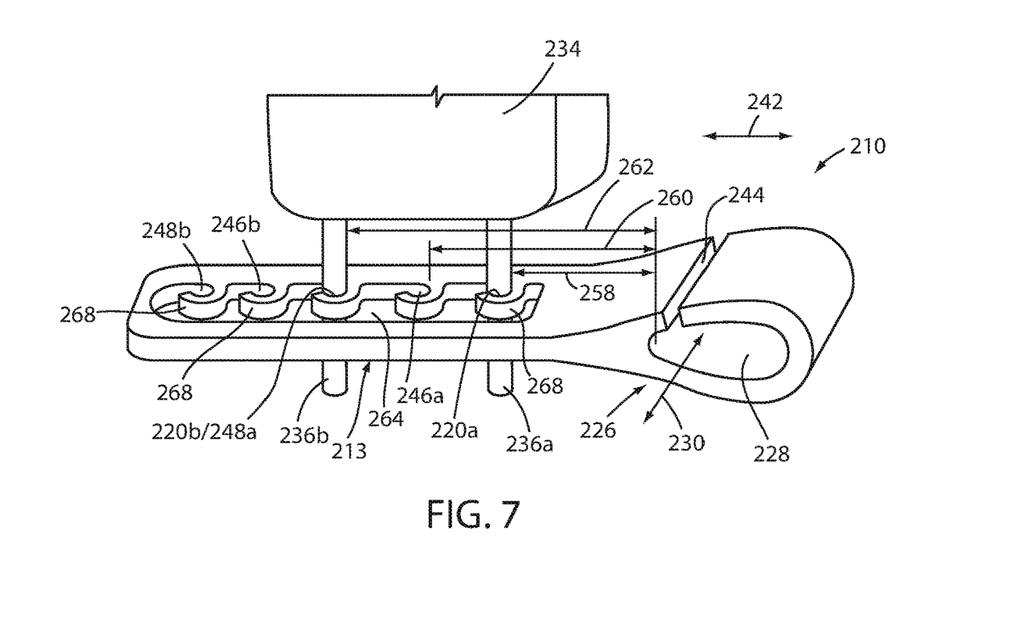
FIG. 7 is a front perspective view of a further variation of a seatbelt webbing guide according to another aspect of the disclosure.

FIG. 7 depicts a further embodiment of webbing guide 210 that is general similar to webbing guide 110 discussed above with respect to FIG. 6. In the variation of webbing guide 210 depicted in FIG. 7, the post holes 220, 246, 248 are defined within an enlarged slot 264 by a plurality of snap tabs 268 that extend outwardly within slot 264 to surround portions of the corresponding post holes 220, 246, 248. In this arrangement, snap tabs 268 leave an opening between the corresponding post holes 220, 246, 248 and slot 264 such that posts 236 can be snapped into and out of respective ones of post holes 220, 246, 248. As illustrated, the positioning of the post holes 220, 246, 248 in the enlarged slot 264 results in a serpentine shape of slot 264 interconnecting post holes 220, 246, 248. In this manner, the positioning of webbing guide 210 relative to, for example, headrest 233 can be adjusted in a similar manner to webbing 110, discussed above, by snapping posts 236a, 236b into and out of engagement with selective corresponding pairs of post holes, including first pair 220a, 220b, second pair 246a, 246b, and third pair 248a, 248b. When posts 236a, 236b are disposed within slot 264 and not within any ones of post holes 220, 246, 248 webbing guide 210 may be generally freely moved in direction 242 for adjustment of guide channel 228 and reattachment of webbing guide 10 with vehicle seat 12 in a different fixed position.

As further illustrated in FIG. 7, in a particular arrangement the various ones of post holes 220, 246, and 248 can extend generally along an entire width lateral length of base 213 and spaced apart therein in such that at least one of post holes 220b, 248a, depending on the particular positioning of guide channel 228 at the respective distances 258, 260, 262 from post 236a, can be engaged with either of posts 236a or 236b (as depicted in FIG. 7). In this manner, three positions, for example, can be achieved by use of five of the above-described post holes, including post holes 220b, 248a.

Figure 8:
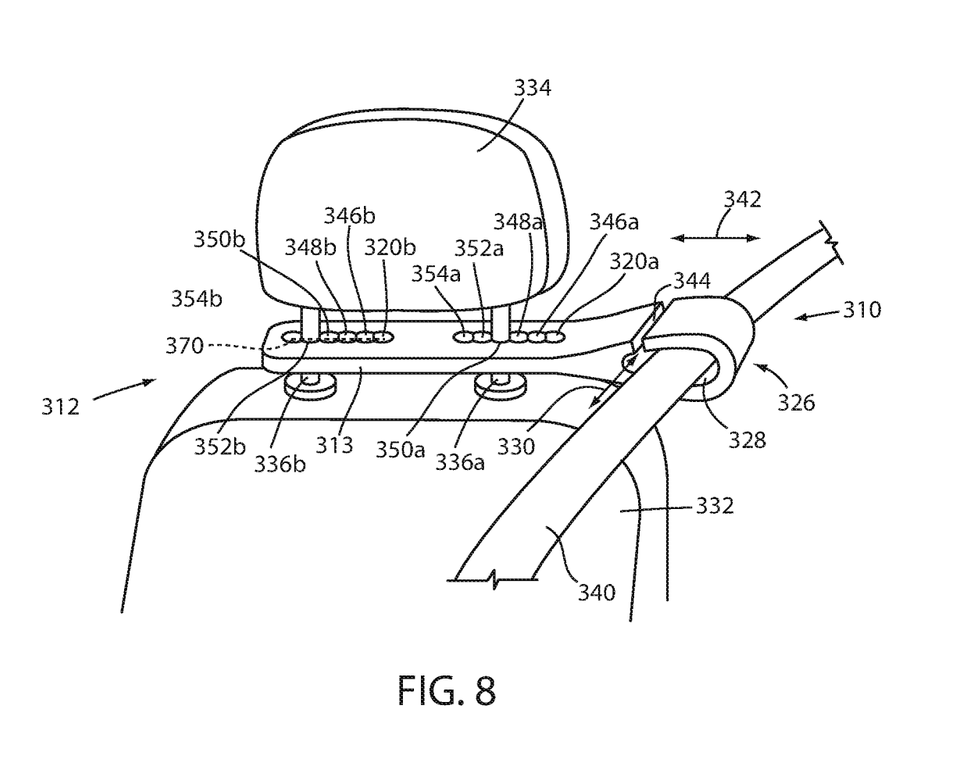
FIG. 8 is a front perspective view of a further variation of a seatbelt webbing guide according to another aspect of the disclosure shown assembled on a vehicle seat.

In a further embodiment of webbing guide 310 depicted in FIG. 8, a plurality of respective pairs of post holes 320, 346, 348, 352, and 354 can overlap so as to be generally joined among a direct channel 370 defined therebetween. The particular width of such channel 370 and/or the amount of overlap between post holes 320, 346, 348, 350, and 354 can determine an amount of force required to move webbing guide 310 in direction 342 by way of movement of post 336a, 336b among engagement of respective ones of the pairs of post holes, e.g., 350a, 350b, as depicted in FIG. 8. In general, such an arrangement as facilitated by outward flexation of base 313 in the area of post holes 320, 346, 348, 352, 354, as well as channel 370 defined thereamong. To facilitate such an arrangement, base 213 can be constructed of a somewhat flexible polymeric, including various forms of plastic or the like. In general, the material used to construct base 313, and to further construct guide body 226 in an integral arrangement, for example, should be rigid enough to appropriately position webbing 340 by way of engagement within guide channel 328, while providing an amount of flexation desired for forcibly moving webbing 310 in direction 342, as desired by a user.

Figure 9:
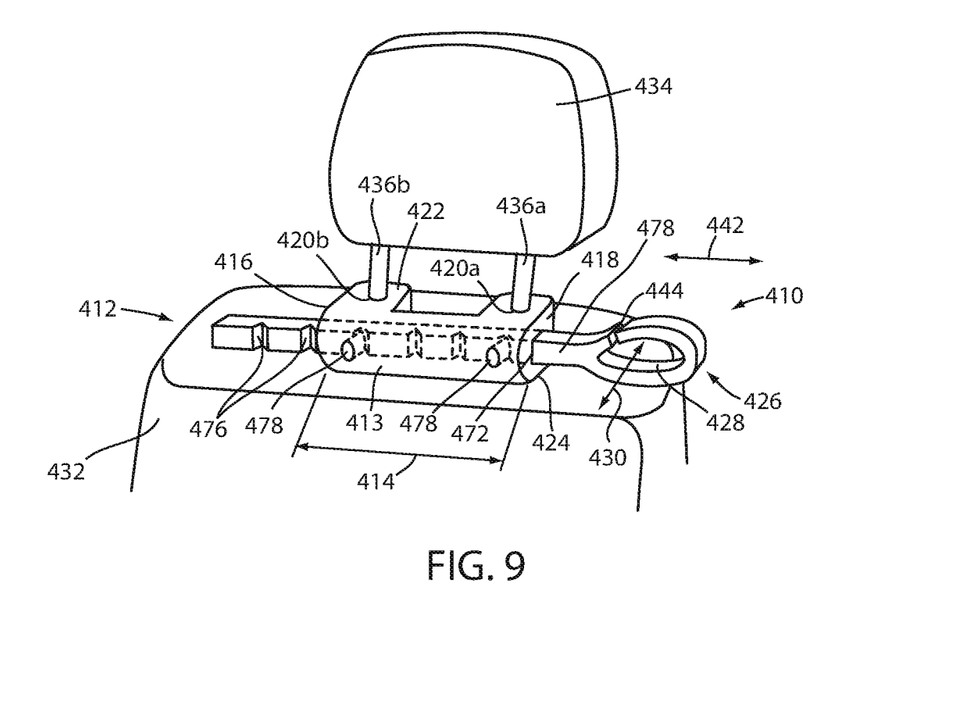
FIG. 9 is a front perspective view of a further variation of a seatbelt webbing guide according to another aspect of the disclosure shown assembled on a vehicle seat.
Figure 10A:
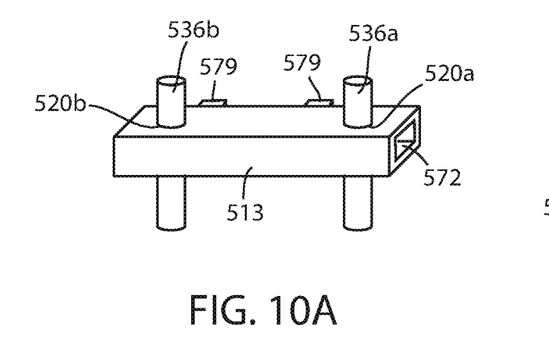
FIGS. 10A and 10B are front perspective and side elevation views of a base useable in a variation of the webbing guide of FIG. 9.
Figure 10B:
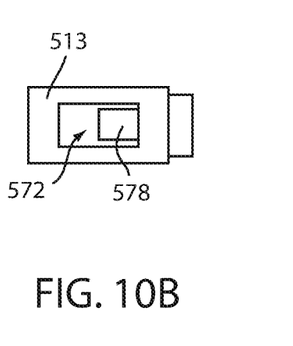
Figure 11:
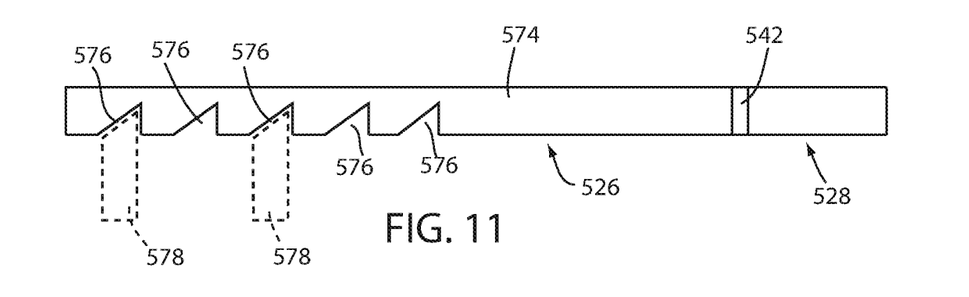
FIGS. 11 and 12 are top and front views of a guide body useable with the base of FIGS. 10A and 10B.
Figure 12:
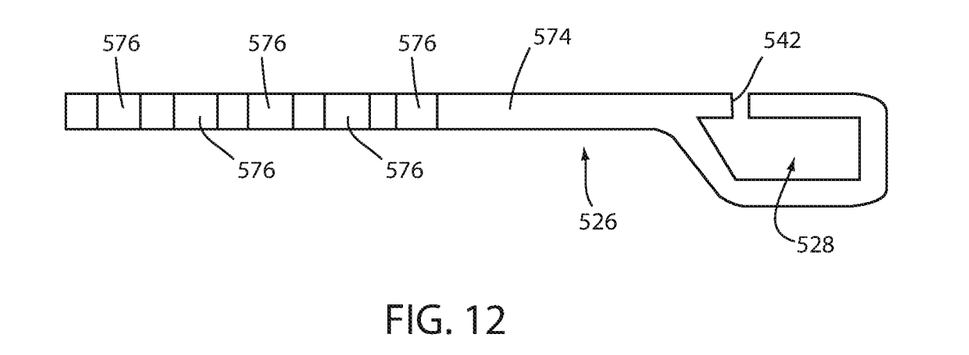

Turning now to FIG. 9, a further embodiment of webbing guide 410 is illustrated in which base 413 and guide body 426 are configured as separate elements that enterengage with one another to allow for adjustment of the lateral position of 428 with respect to vehicle seat 412. As illustrated, base 413 includes post holes 420a, 420b, which engage with posts 436a, 436b respectively, to couple webbing guide 410 with vehicle seat 412 in a manner discussed above. Base 413 further defines an interior channel 472 that receives a stem 474 that extends along a portion of guide body 426 away from guide channel 428. Stem 474 is slidably received within interior channel 472 to allow for adjustment of guide body 426 and, accordingly guide channel 428 in direction 442. In an embodiment such an engagement can be frictional so as to help maintain a desired location of guide channel 428.

In a further embodiment as shown in FIG. 9, base 413 can include a plurality of projections 478 that are biased (such as by spring-biasing, or the like) into interior channel 472 to selectively engage with ones of detents 476 deified within stem 474 of guide body 426. In this manner, the engagement between projections 478 and detents 476 can define ones of various positioning of guide channel 428 with respect to the fixed base 413. Further, by tuning the amount of biasing of projections 478 into engagement with detents 476, as well as the geometric relationship between detents 476 and projections 478, the amount of force required to move stem 474 within interior channel 472 can be adjusted. In this manner, a desired amount of force upon guide body 426 can be required for movement of guide channel 428 with respect to seatback 432. In an embodiment such tuning can be done such that the force required for movement of guide body 426 with respect to base 413 is greater than that which may be applied on guide body 426 by webbing 430 during general movement of an occupant 4 on vehicle seat 412 to prevent inadvertent movement of guide channel 428.

As shown in FIGS. 10A-12, a variation of such an embodiment can include detents 576 that are asymmetrical along with projections in the form of pawls 578 that enterengage with detents 576 in a ratchet-type arrangement wherein guide body 526 can be generally moved in a direction wherein guide channel 528 is moved away from base 513 at a predetermined force level dictated, as described above. In such an arrangement, further, guide body 526 is generally restricted from movement in a direction wherein guide channel 528 is brought closer to base 513. In this manner inadvertent movement of guide channel 528 toward base 513 is generally prevented, including by pulling on webbing 540, which would, potentially, result in such movement. To allow for movement of guide body 526 in such a direction, when desired by a user, a plurality of buttons 579 may be respectively associated with ones of pawls 578 such that, when depressed pawls 578 are moved outwardly with respect to interior channel 572, thereby allowing guide body 526 to be generally freely moved with respect to base 513.

Figure 13:
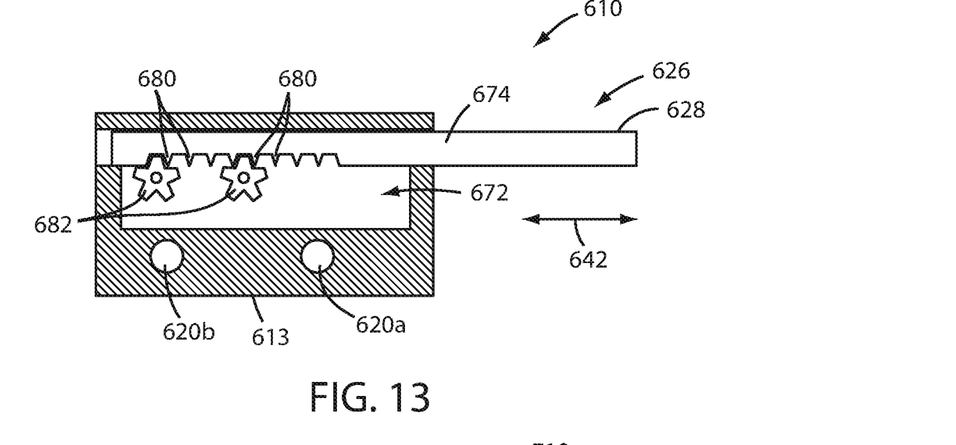
FIG. 13 is a top cross-section view of a variation of the seatbelt webbing guide of FIG. 9.

In FIG. 13, a further variation of the above-described arrangement is shown in which one or more gears 682 are disposed at least partially within interior channel 672 and are coupled with base 613. Gears 682 can engage with teeth 680 defined linearly along stem 674 of guide body 626. In this manner the coupling of gears 682 with base 613 can help dictate and/or control and amount of force required to move guide body 626 along direction 642. By way of example, gears 682 can be coupled with base 613 such that a plurality of detents corresponding with particular rotatable positions of gears 682 are achieved. In this manner predetermined incremental positionings of guide body 626 can be achieved. In a further example, a dampened or friction-restricted coupling between gears 682 and base 613 can be employed such that a particular amount of force is required on guide body 626 to move it in direction 642 with respect to base 613. Still further, a ratchet-type arrangement can be employed with respect to gears 682 such that movement of guide channel 628 toward base 613 is restricted, similar to the manner which is described above. In such an arrangement, buttons similar to those described above can be associated with such a ratchet mechanism to allow force selective movement of guide channel 628 toward base 613.

Figure 14:
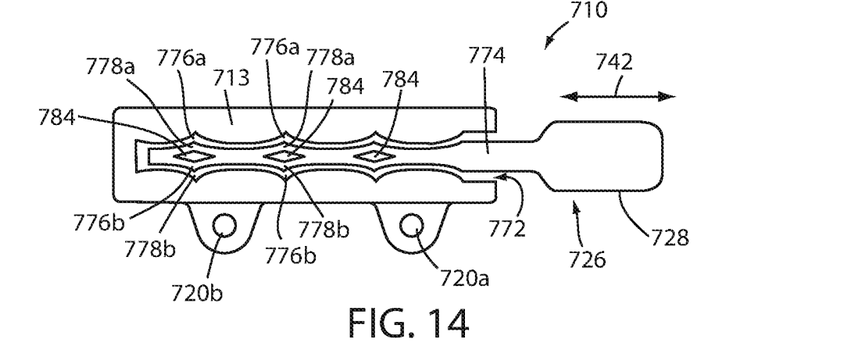
FIG. 14 is a top cross-section view of a further variation of the seatbelt webbing guide of FIG. 9.
Figure 15:
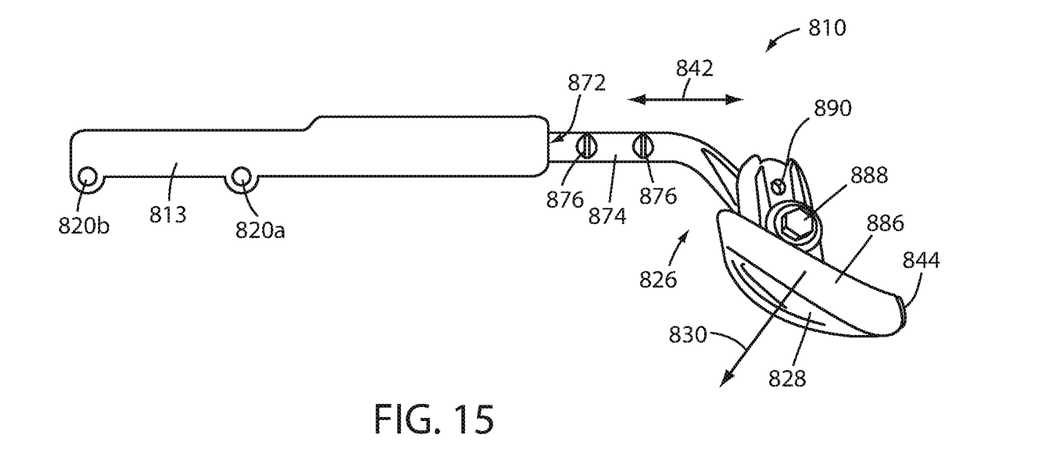
FIG. 15 is a top perspective view of a further variation of a seatbelt webbing guide according to another aspect of the disclosure.
Figure 16A:
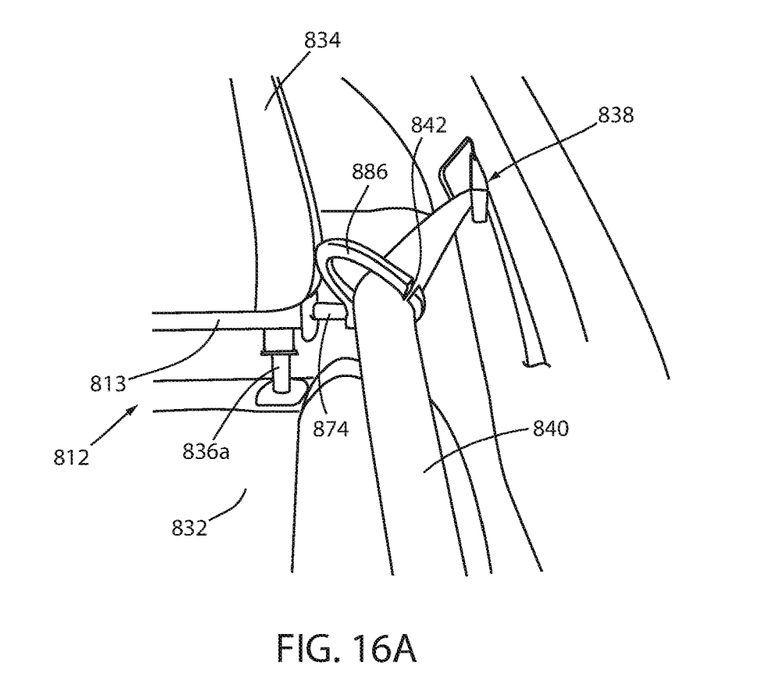
FIG. 16A is a front perspective view of the webbing guide of FIG. 15 assembled with a vehicle seat.
Figure 16B:
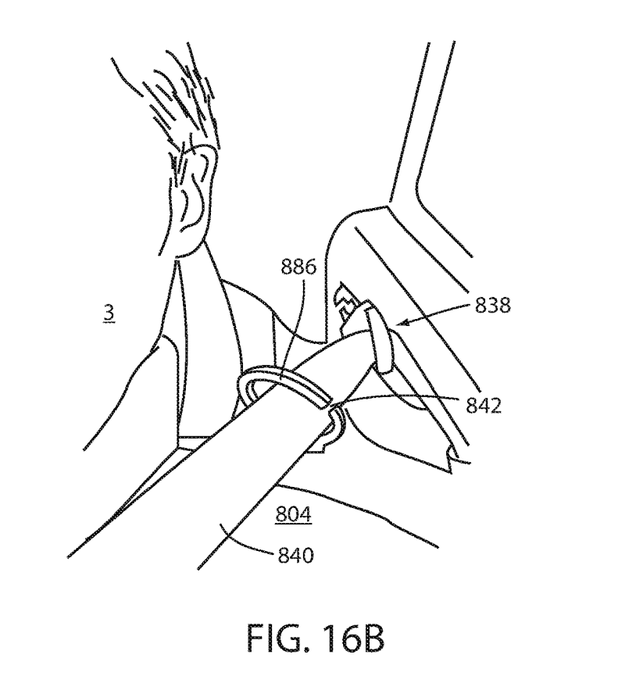
FIG. 16B is a front perspective view of a vehicle seat having an occupant and showing a possible positioning of an associated seatbelt webbing with respect to the occupant, as provided by the webbing guide of FIG. 16A.
Figure 17A:
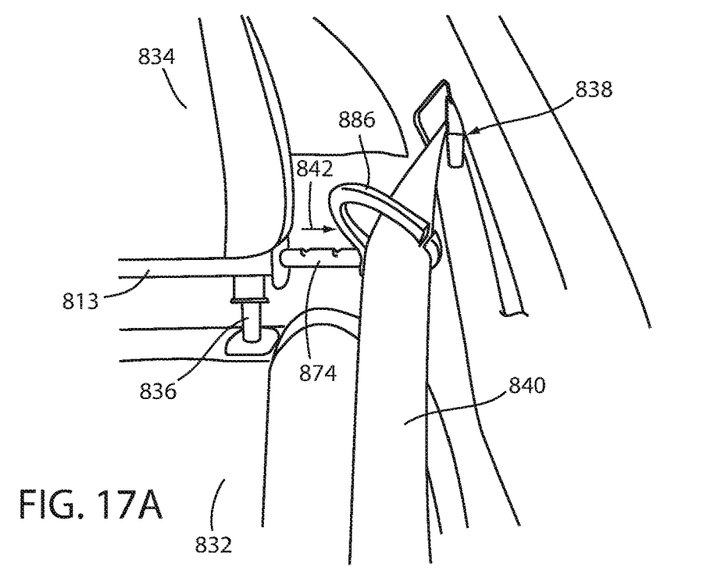
FIG. 17A is a front perspective view of the webbing guide of FIG. 15 assembled with a vehicle seat with a guide body thereof in a second position with respect to the vehicle seat headrest.
Figure 17B:
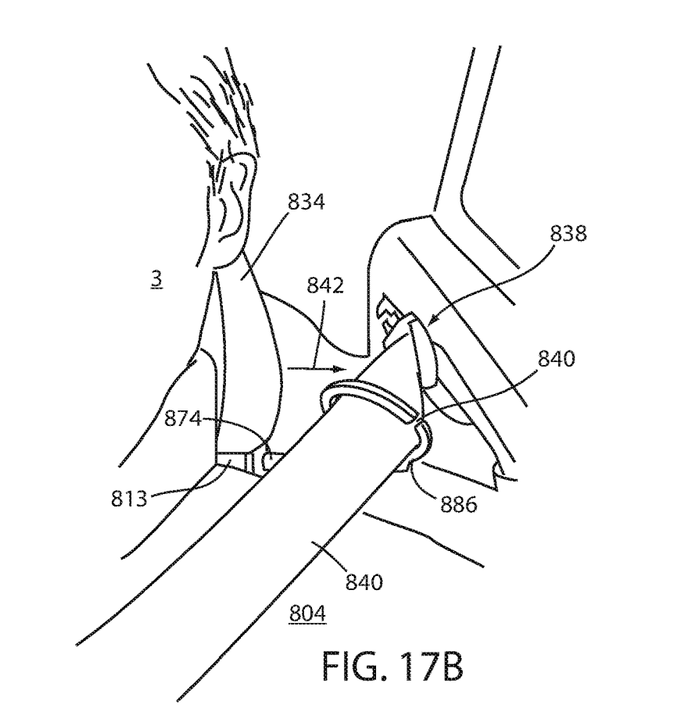
FIG. 17B is a front perspective view of the vehicle seat having an occupant of FIG. 16 showing a possible alternative positioning of an associated seatbelt webbing with respect to the occupant, as provided by the webbing guide configuration of FIG. 17A.

In a further arrangement, shown in FIG. 14, interior channel 772 can define a plurality of detents 776a and 776b, aligned on opposite sides thereof, to selectively enterengage with projections 778a, 778b on opposite sides of stem 774 to provide a snap-type action for movement for guide body 726 in direction 742 with respect to base 713. In such an arrangement stem 774 can further define a plurality of compression openings 784 extending therethrough in the area of projections 778a, 778b to allow for inward movement of projections 778a, 778b during forcible movement of guide body 726 in direction 742. In the same manner which is generally discussed above, stem 774 can be made from a resiliently deformable and/or compressible material to facilitate such inward movement of projection 778a, 778b, while maintaining a desired rigidity of guide body 726 overall.

In a further embodiment, as illustrated in FIGS. 15-17b, guide body 826 can be constructed of multiple components that are coupled together to achieve further adjustability of webbing guide 810. In the manner depicted, stem 874 can be a first component of guide body 826 and slidably received within interior channel 872 of base 813, as described above. Further, stem 874 can define a plurality of detents 876 that can selectively engage with projections along an interior of interior channel 872, also in a manner similar to that which is described above. In an example, stem 874 can be made of metal, rigid plastic, or the like.

A separate guide body loop 886 can be coupled on an end of stem 874 opposite base 813. In an example, guide loop 886 can be rotatably coupled with stem 874, such as by a hinge or a vault 888, as depicted in FIG. 5. Such rotational movement can allow for guide channel 828 to be oriented to receive an associated webbing therethrough with the particular direction 830 being alignable with the direction of the associated webbing within a range that would still be generally considered perpendicular direction 842, as well as the direction of post holes 820a, 820b, as discussed in further detail above. As further shown in FIG. 15, guide loop 886 can include a plurality of holes 890 therein for mounting on stem 874. In this manner, guide channel 828 can be adjustable in a fore and aft direction by selective utilization of such holes for mounting loop 886 with stem 874. As shown in FIGS. 16a, 16b, 17a, and 17b, stem 874 can be adjusted in direction 842 with respect to base 813 to achieve various positions of an associated webbing 840 with respect to seatback 832 and/or headrest 833, thereby achieving an adjustable position of webbing 840 with respect to a user 804.

It is to be understood that variations and modifications can be made on the aforementioned structure without departing from the concepts of the present invention, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A webbing guide for a vehicle seat, comprising:
a base defining a length between a first end and a second end and defining a plurality of pairs of corresponding spaced-apart post holes extending through the base between top and bottom surfaces thereof and configured to receive a post of a headrest of a vehicle seatback, wherein the top surface is planar between the first end and the second end; and
a guide body integrally formed with the base at the second end and defining a guide channel disposed beneath the top surface and extending through the guide body in a fixed direction generally normal to the length of the base and normal to the post holes;
wherein the top surface comprises an opening configured to allow a seatbelt webbing to be selectively moved into and out of the guide channel.

2. The webbing guide of claim 1, wherein a seatbelt webbing associated with the vehicle seat is received through the guide channel.

3. The webbing guide of claim 1, wherein each of the pairs of spaced-apart post holes are spaced apart from each other at a first distance.

4. The webbing guide of claim 3, wherein successive first post holes of each of the pairs of corresponding spaced apart post holes are positioned at increasing distances from the guide channel.

5. The webbing guide of claim 4, wherein the pairs of corresponding spaced-apart post holes are arranged in the base with all of first ones of pairs of corresponding spaced-apart post holes closest to the guide channel in the respective pairs of corresponding spaced-apart post holes are adjacent each other and remaining second ones of pairs of corresponding spaced-apart post holes are adjacent each other.

6. The webbing guide of claim 1, wherein ones of the post holes within the plurality of pairs of corresponding post holes are interconnected by a slot in the base.

7. The webbing guide of claim 6, wherein the slot extends through respective centers of the ones of the post holes.

8. The webbing guide of claim 6, wherein the slot defines one of a keyed or serpentine shape.

9. A vehicle seat, comprising:
a seatback;
a headrest coupled with the seatback by a pair of posts; and
a webbing guide, including:
a base defining a length between a first end and a second end and defining a plurality of pairs of corresponding spaced-apart post holes extending through the base between top and bottom surfaces thereof and configured to receive a respective post of the headrest; and
a guide body coupled with the base and defining a guide channel extending through the guide body and spaced apart from the post holes, wherein the guide body is fixed relative to the base such that the guide channel extends in a direction that is normal to an axis extending through the post holes, and further wherein a top surface of the guide body extending above the guide channel is coplanar with the top surface of the base;
wherein the top surface of the guide body comprises an opening configured to allow a seatbelt webbing to be selectively moved into and out of the guide channel.

10. The vehicle seat of claim 9, wherein a seatbelt webbing associated with the vehicle seat is received through the guide channel.

11. The vehicle seat of claim 9, wherein the guide channel is moveable toward and away from the headrest such that movement of the guide channel adjusts a position of the webbing with respect to the headrest.

12. The vehicle seat of claim 9, wherein each of the pairs of spaced-apart post holes are spaced apart from each other at a first distance.

13. The vehicle seat of claim 12, wherein successive first post holes of each of the pairs of corresponding spaced apart post holes are positioned at increasing distances from the guide channel.

14. The vehicle seat of claim 13, wherein the guide channel is moveable toward and away from the headrest by disengagement of the posts from a first one of the pairs of post holes and engagement of the posts with another pair of the plurality of pairs of post holes.

15. The vehicle seat of claim 9, wherein the pairs of corresponding spaced-apart post holes are arranged in the base with all of first ones of pairs of corresponding spaced-apart post holes closest to the guide channel in the respective pairs of corresponding spaced-apart post holes are adjacent each other and remaining second ones of pairs of corresponding spaced-apart post holes are adjacent each other.

16. The vehicle seat of claim 9, wherein ones of the post holes within the plurality of pairs of corresponding post holes are interconnected by a slot in the base.

17. The vehicle seat of claim 16, wherein the slot extends through respective centers of the ones of the post holes.

18. The vehicle seat of claim 16, wherein the slot defines one of a keyed or serpentine shape.

19. A vehicle, comprising:
- a vehicle seat coupled within the vehicle and including a seatback and a headrest coupled with the seatback by a pair of posts;
- a webbing coupled with the vehicle and associated with the vehicle seat; and
- a webbing guide, including:
  - a base defining a length between a first end and a second end and defining a plurality of pairs of corresponding spaced-apart post holes extending through the base between top and bottom surfaces thereof and configured to receive a respective post of the headrest, and
  - a guide body fixedly coupled with the base and defining a guide channel extending through the guide body, receiving the webbing, and spaced apart from the posts, the guide body further defining a top surface that is positioned above the guide channel and coplanar with the top surface of the base, wherein the guide channel extends in a direction that is normal to an axis extending through the post holes;
  - wherein the top surface of the guide body comprises an opening configured to allow a seatbelt webbing to be selectively moved into and out of the guide channel.

20. The vehicle of claim 19, wherein:
each of the pairs of spaced-apart post holes are spaced apart from each other at a first distance; and
successive first post holes of each of the pairs of corresponding spaced-apart post holes are positioned at increasing distances from the guide channel.

\* \* \* \* \*